United States Patent
Susnjara

(10) Patent No.: US 6,580,963 B2
(45) Date of Patent: Jun. 17, 2003

(54) SYSTEM AND METHOD FOR AUTOMATICALLY TRACKING AND UTILIZING EXCESS MATERIAL ON A CNC MACHINING SYSTEM

(75) Inventor: Kenneth J. Susnjara, Birdseye, IN (US)

(73) Assignee: Thermwood Corporation, Dale, IN (US)

( * ) Notice: Subject to any disclaimer, the term of this patent is extended or adjusted under 35 U.S.C. 154(b) by 292 days.

(21) Appl. No.: 09/734,610

(22) Filed: Dec. 13, 2000

(65) Prior Publication Data
US 2002/0072824 A1 Jun. 13, 2002

(51) Int. Cl.[7] .................................................. G06F 19/00
(52) U.S. Cl. ....................................... 700/171; 700/173
(58) Field of Search ............................ 700/97, 99, 106, 700/171, 173, 174, 175, 28, 32, 33

(56) References Cited

U.S. PATENT DOCUMENTS

| 3,931,501 A | | 1/1976 | Barr et al. |
| 3,942,021 A | | 3/1976 | Barr et al. |
| 5,815,398 A | * | 9/1998 | Dighe et al. ................ 700/217 |
| 5,953,232 A | * | 9/1999 | Blaimschein ............... 700/171 |
| 6,009,353 A | * | 12/1999 | Nakamura et al. .......... 700/172 |
| 6,205,370 B1 | * | 3/2001 | Blaimschein et al. ....... 700/134 |

* cited by examiner

Primary Examiner—Leo Picard
Assistant Examiner—Ryan A. Jarrett
(74) Attorney, Agent, or Firm—Stevens, Davis, Miller & Mosher, LLP

(57) ABSTRACT

In many manufacturing industries, off-fall or excess raw materials are often wasted as scraps. Even if the excess raw materials are later reused, they are not being used in an optimized way. The present invention discloses a system and method of profiling excess raw materials, assigning an identity to each excess raw material, storing the identity in a database, and using nesting part program techniques to identify an excess raw material best suited for the nested part programs.

21 Claims, 4 Drawing Sheets

SYSTEM AND METHOD FOR AUTOMATICALLY TRACKING AND UTILIZING EXCESS MATERIAL ON A CNC MACHINING SYSTEM

FIELD OF THE INVENTION

The present invention is in the field of maximizing use of raw materials in a computer numerical controlled machine manufacturing environment.

BACKGROUND OF THE INVENTION

It has become a common practice in furniture and cabinet manufacturing operations to utilize Computer Numeric Controlled routers to fabricate casework components from large sheets of material, such as those disclosed in U.S. Pat. Nos. 3,942,021 and 3,931,501. Frequently, the flat casework components for an end-product are consecutively processed from the same sheet of material. Given that different components are different in sizes and shapes, tremendously amount of wastage could result from a lack of prior planning. Therefore, effective material utilization has become a major challenge in this type of manufacturing method.

In some cases, a software algorithm in a machine control may be utilized to automatically arrange the positioning of component cutting programs in such a manner as to minimize the amount of space between component profiles, thus consuming the least amount of material from a given sheet. This is commonly referred to as nesting. Nesting has significantly contributed to both the versatility and productivity of furniture and cabinet operations. However, even in a typical custom casework operation with nesting, as much as 30 to 50 percent of the final sheet from a production run may remain unused, thus, becoming off-fall material or off-fall sheets. Unless this material can be used for another product, it will be scrapped.

SUMMARY OF THE INVENTION

The first object of the present invention is to provide a software system for automatically nesting a plurality of individual part sub-programs, entered into a machine control on an individual basis, to achieve the optimum placement density on a sheet of raw material for maximum material conservation.

A further object is to automatically monitor and sort the off-fall material from a CNC cutting cycle, according to size, shape, and type, then utilize said off-fall as raw material in subsequent cutting cycles, based on an optimum nesting pattern.

DETAIL DESCRIPTION OF THE INVENTION

The invention disclosed herein provides a software system located within the CNC machine control, that automatically identifies and tracks off-fall sheets according to size, shape and type. The software system performs nesting of individual part programs in the control, so as to optimized usage of the off-fall sheets given their sizes, shapes and types.

When individual part programs are loaded into the machine control, the system will either automatically nest parts onto appropriately sized off-fall sheets that are leftovers from the previous cutting cycle, or prompt the operator as to which off-fall pieces from previous cutting cycles should be utilized for optimum material utilization. The system can then nest all, or a portion of the individual part programs into one or more individual off-fall sheets, grouping the part programs and off-fall sheets into the optimum combination for maximum material conservation.

Figure 1:
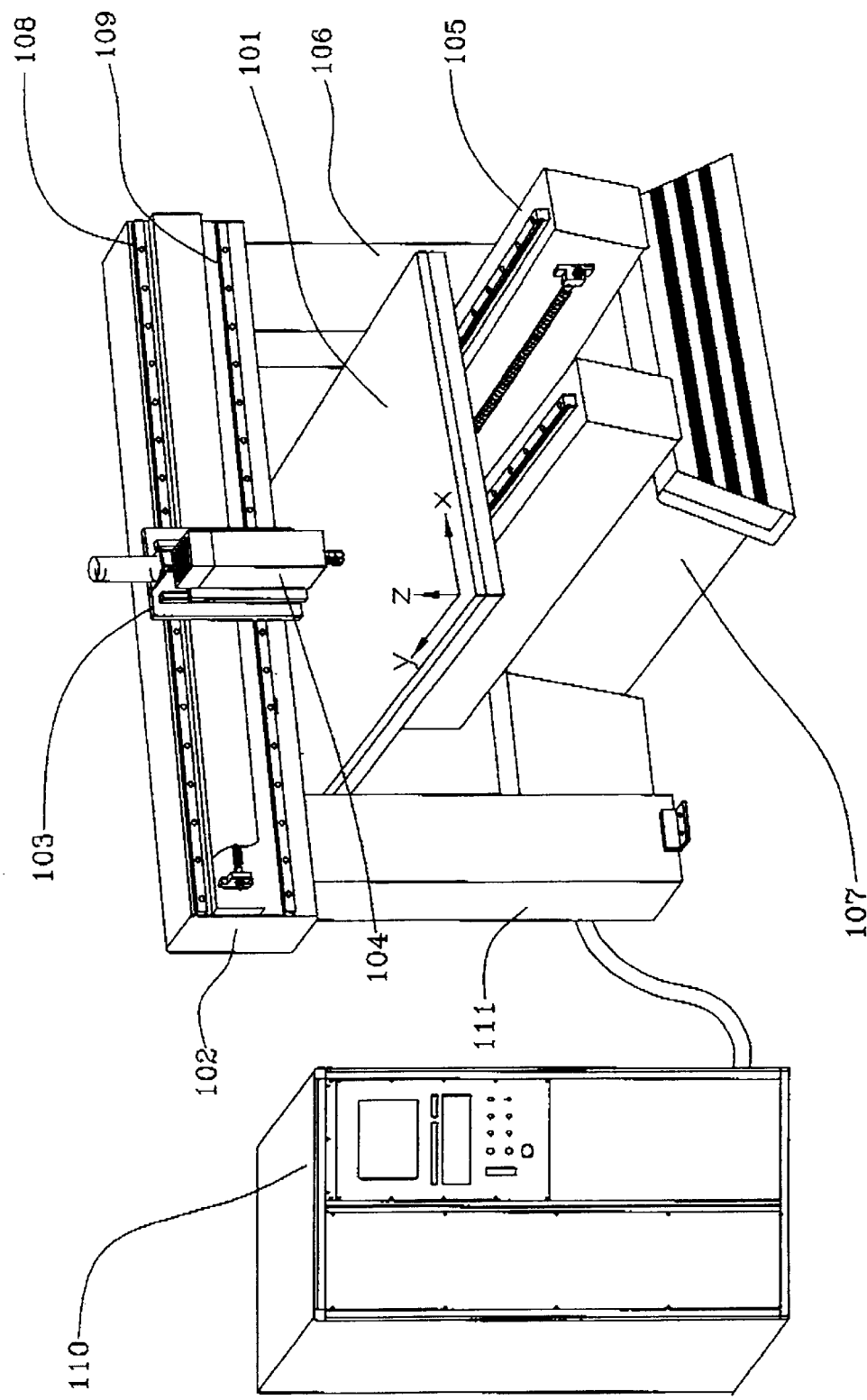
FIG. 1 illustrates the embodiment of a computer numeric controlled machining system.

Referring to the drawing in FIG. 1, there is illustrated, an embodiment of a computer numeric controlled (CNC) machining system, which generally includes a base member 107, a worktable 101, a gantry, a toolhead support assembly 103, and an electric spindle, 104. The gantry, includes a pair of leg members, 106 and 111, rigidly secured at their lower ends to the base member and a transversely disposed section 102, supported on the leg sections and spanning above the worktable. The base member is formed of steel sections welded together to provide a rigid and stable foundation. Worktable 101 is mounted horizontally with the surface parallel to the x and y axes plane and is adapted to be displaced longitudinally relative to the base member or along a y-axis. The front face of transverse section 102, is provided with a pair of vertically spaced, transversely disposed rails 108, and 109, onto which toolhead support assembly 103, is mounted and displaceable transversely or along an x-axis. Electric spindle 104, is mounted on the bottom of the toolhead support assembly and is adapted to be displaced vertically by same. Each of worktable 101, toolhead support assembly 103, and electric spindle 104, is displaceable along its respective axis by a feedscrew arrangement driven by an AC servomotor. The operation of such servomotor is controlled by a programmable computer-numeric controller 110 to provide for movement of a tool mounted on the toolhead along a motion path to perform a work function such as routing, shaping, drilling and the like on a workpiece mounted to the worktable. Instead of the worktable being displaceable and the gantry being stationary as described, the worktable can be stationary and the gantry may be displaceable along the Y-axis to provide displacement between the gantry and the worktable.

In CNC panel processing operations of the present invention, it utilizes nesting software systems to distribute individual component cutting profiles on a panel or sheet of material for optimum material utilization. A nesting software system of the present invention utilizes a mathematical algorithm to derive numerous permutations of part placement patterns, and then selects the pattern most favorable for maximum material conservation.

Figure 2A:
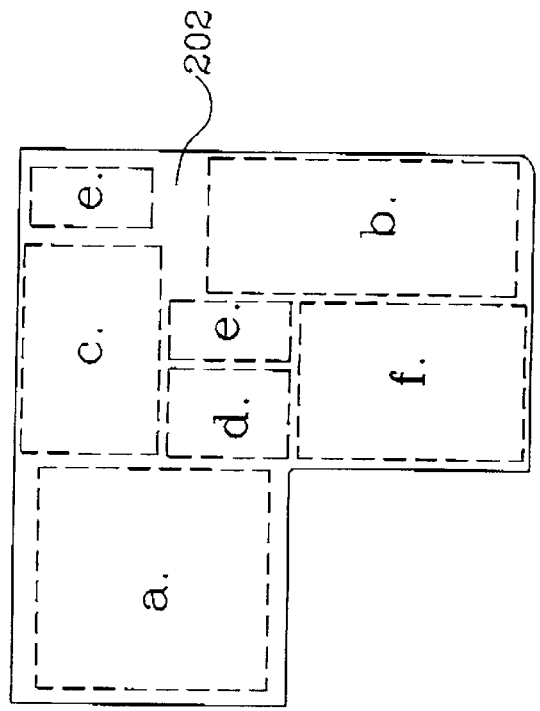
FIG. 2a illustrates a piece of off-fall scrap from FIG. 2 with workpiece sub-programs nested for optimum material utilization.
Figure 2:
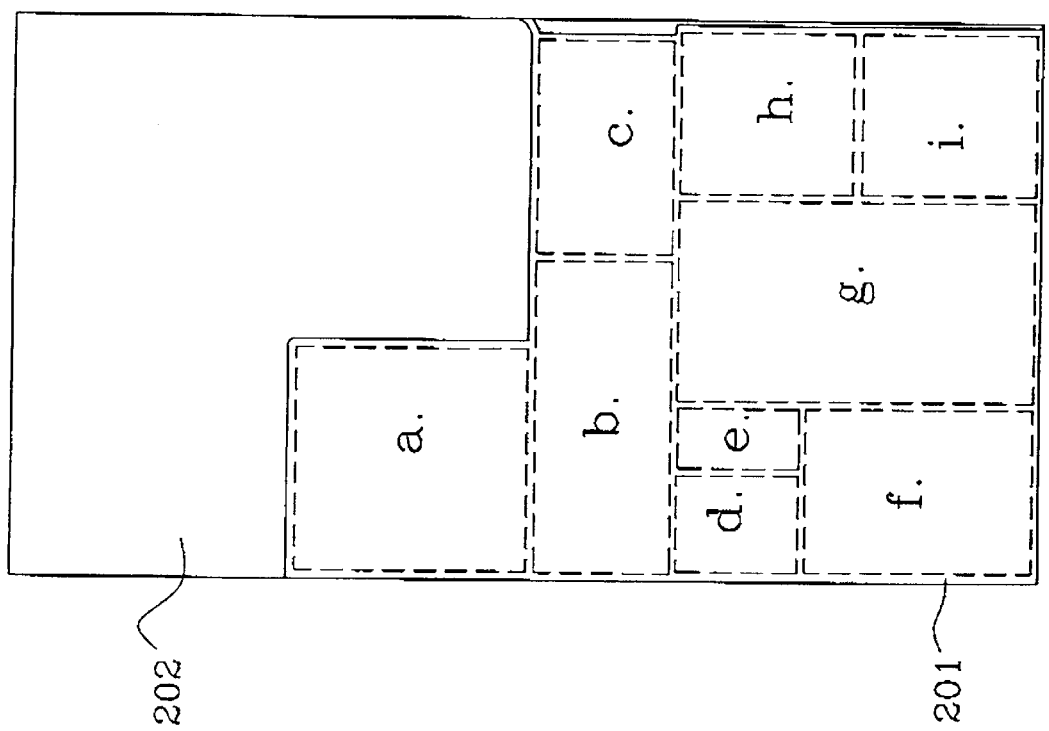
FIG. 2 illustrates a complete sheet of material with workpiece sub-programs nested for optimum material utilization.

A sheet of raw material 201, with a plurality of individual part programs representatively labeled as "a" through "i" nested thereon, is illustrated by way of an example in FIG. 2. The remainder of the material sheet or off-fall sheet 202 is not being utilized in the present cutting order and will therefore become a major portion of the waste material. Such waste material is regarded and identified herein as off-fall, because in reality, this material will be utilized again in future nested cutting operations as is exemplified in FIG. 2a.

As shown by way of an example, a plurality of subprograms a, b, c, d, e and f is nested on the off-fall sheet 202 in a manner so as to maximize the usage and minimize the wastage of the off-fall sheet 202. As can be readily seen, the representatively shown part programs a, b, c, d, e and f in FIG. 2a are indeed identical as the representatively shown part programs a, b, c, d, e and f in FIG. 2. The nesting has been variously rearranged so as to best fit the profile of the off-fall sheet 202. Notice that the final nesting in FIG. 2a contains two part programs e. This is done to make use of the otherwise waste material defined by the boundaries of part programs b, c and e.

The shape and area, generally referred to as a profile of the aforementioned off-fall is recorded in the memory of the machine control by first assigning geometric values to distinctly identify the size and shape of the material, and then assigning an identifying number for future selection and retrieval. The type of material is also tracked and encoded in the identifying number, based on the type of material specified in the original prompting to load the material. The operator also has the capability of editing the database, manually adding or removing off-fall sheets.

In subsequent operations, as individual workpiece programs are entered into the control or various workpiece programs are loaded into the control, the aforementioned off-fall, along with other previously entered off-fall pieces, will be considered for nesting the workpiece programs.

Figure 3:
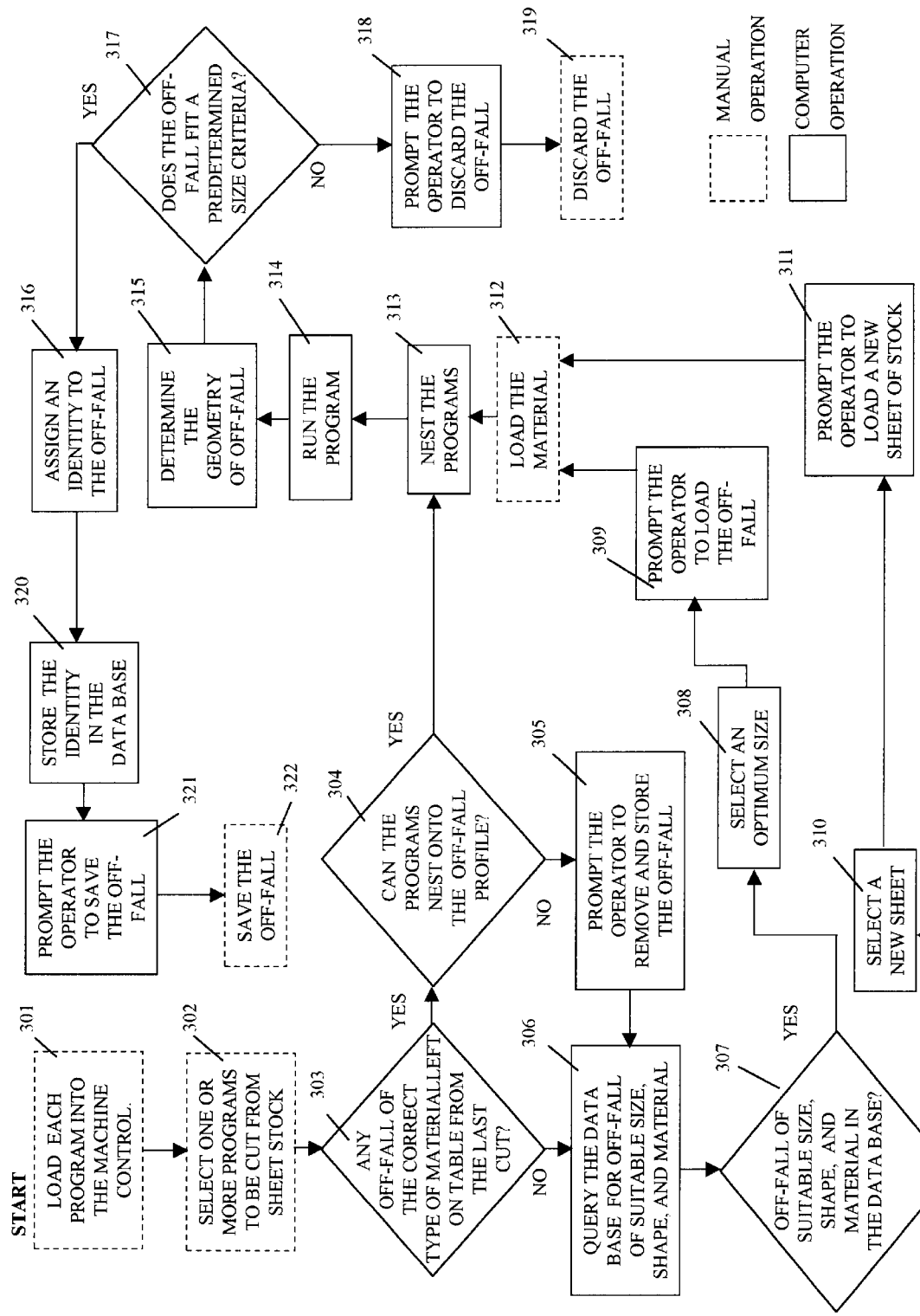
FIG. 3 is a logic-flow diagram of the rolling nesting operation.

Referring to the logic-flow diagram of FIG. 3, cutting part programs are entered into the CNC control for future processing, as shown in step 301. The operator selects one or more part programs to cut the sheet stock residing on the worktable 101, as shown in step 302. The control then checks the geometry and material type of any off-fall sheet residing on the worktable left from the preceding operation, as shown in step 303, and a determination is made as to whether this material is of a favorable size and type for nesting a number of selected programs for the next cutting operation, as shown in step 304. If the number of selected cutting programs fit ideally within the boundary of the off-fall material, the programs will be nested, as shown in step 313. However, if there is no material left on the worktable, or if the remaining off-fall material is not suitable for nesting the number of selected cutting programs, due to inadequate sizing or wrong material type, the operator will be prompted to remove the off-fall material for future use, as shown in step 305. A database in the control or located elsewhere can be queried for material of suitable size, shape, and type, as shown in step 306. If any off-fall material meeting the proper criteria is identified by the database, the best available size and shape of the existing stock is selected by a computer algorithm, as shown in step 308, and the operator is prompted by the control as to which piece of material to load onto the worktable, as shown in step 309. The operator will then load the material, as shown in step 312, and the control will proceed to nest the cutting programs, as shown in step 312. If no off-fall material meeting the proper criteria is identified by the database, the control will use a new sheet of material, as shown in step 310. The operator will then be prompted to load a new sheet of material of the proper type, as shown in step 311. At this time, the control will nest the cutting programs into the selected material piece, as shown in step 313, and the program proceeds to run, as shown in step 314. After the program is completed, the machine control utilizes an algorithm to determine the geometry of the off-fall material, as shown in step 315. If the geometry of the off-fall material falls within a predetermined criteria, for example, the excess material remaining is at least 30% of a new workpiece, the excess material remaining is at least 1 foot by 2 feet, etc., as shown in step 317, an identity will be assigned to the off-fall material, as shown in step 316, and stored in the database, as shown in step 320. The operator will then be prompted to save the off-fall material, as shown in step 321, and the off-fall material will be left to remain on the worktable for the next program nesting consideration or appropriately stored for future use, as shown in step 322. If, however, the geometry of the material does not fall within the predetermined criteria, the operator will be prompted to discard the material, as shown in step 318.

Figure 4:
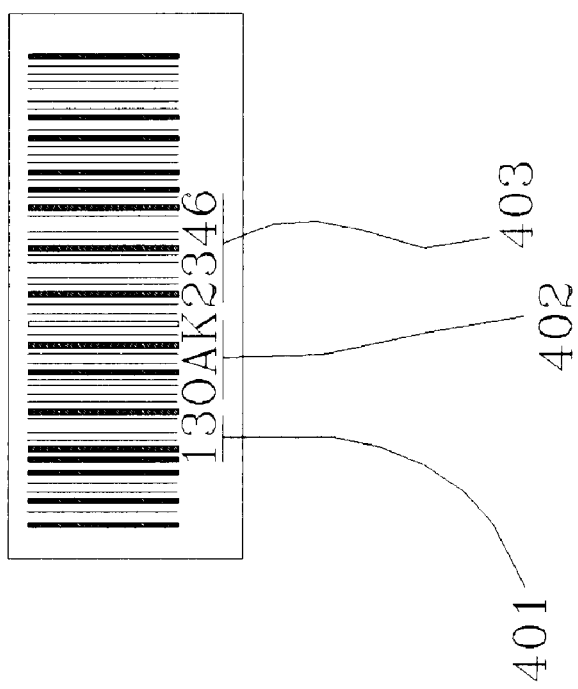
FIG. 4 illustrates a bar-code label encoded with the identifying information for a piece of off-fall.

FIG. 4 illustrates by way of an example an identifier in the form of a bar-coded label that contains the identifying information for a piece of off-fall. This label is merely representative of a label containing the identifying information stored in the control for a particular piece of off-fall. The first set of characters 401 identifies the thickness of the material in millimeters. The second set of characters 402 identifies the type of material. The third set of characters 403 identifies the physical size and shape of the off-fall.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A method of managing an excess material left from a workpiece by using a computer numerical controlled machine with a controller connected to a database, comprising a plurality of steps of:

selecting a workpiece program comprising a group of part programs to be performed on the workpiece;

nesting the part programs onto the workpiece;

machining the parts from the workpiece according to the part programs;

formulating a characteristics profile of any excess material immediately following machining if the excess material fits a predetermined size criterion;

deriving an identity encompassing the characteristics profile of the excess material;

storing the identity in the database;

storing the excess material for later use if no additional machine operations are to be performed; and discarding the excess material if the excess material does not fit the predetermined size criterion.

2. The method of claim 1, further comprising a step of:

nesting a program onto the excess material comprising a plurality of part programs based on the characteristics profile.

3. The method of claim 2, further comprising a step of:

cutting the excess material based on the nested program.

4. The method of claim 1, wherein the characteristics profile comprises a size, a shape and a type of material of the excess material.

5. The method of claim 2, wherein nesting of the program on the excess material is performed immediately after the characteristics profile is formulated.

6. The method of claim 2, wherein the program is created by loading the plurality of part programs into the controller.

7. The method of claim 1, wherein the workpiece is one of a blank or a prior machined excess material, each having a characteristics profile.

8. The method of claim 7, further comprising a step of:
locating from the database a characteristics profile of a workpiece that is suitable for the workpiece program.

9. The method of claim 8, further comprising a step of:
loading a prior machined excess material on a worktable of the computer numerical controlled machine if the characteristics profile for the prior machined excess material is suitable for the workpiece program.

10. The method of claim 9, further comprising a step of:
loading a blank on the worktable of the computer numerical controlled machine if no characteristics profile of any prior machined excess material is suitable for the workpiece program.

11. A method of managing an excess material left from a workpiece by using a computer numerical controlled machine with a controller connected to a database, comprising:
   (a) selecting a group of machine operations comprising part programs to be performed on a workpiece;
   (b) nesting the part programs on the workpiece;
   (c) machining the parts from the workpiece according to the machine operations, wherein the machining is performed on a worktable;
   (d) determining the dimensions and material of any excess material remaining on the worktable immediately following the machining step;
   (e) determining if any additional machine programs can be performed on the excess material that remains on the worktable;
   (f) nesting the additional machine programs into the excess material if any required programs can be performed;
   (g) machining the excess material according to the additional programs.

12. The method according to claim 11, further including the step of:
repeating steps (d) through (g) as necessary.

13. The method according to claim 11, further including the step of:
storing the dimensions and material of the excess material in a database if no additional machine operations can be or need be performed.

14. The method according to claim 13, further including the step of:
labeling the excess material for storage.

15. The method according to claim 14, further including removing the excess material from the machine for storage.

16. The method according to claim 14, wherein a barcode is affixed to the excess material is used in the labeling step.

17. The method according to claim 16, wherein the bar code represents the dimensions and the material of the excess material.

18. The method according to claim 11, wherein the workpiece is either a blank or a prior machined excess material.

19. The method of claim 18, further comprising a step of:
locating from a database dimensions and material of the workpiece that is suitable for the machine operations.

20. The method of claim 19, further comprising a step of:
loading a prior machined excess material on a worktable of the computer numerical controlled machine if the dimensions and material for the prior machined excess material is suitable for the machine operations.

21. The method of claim 20, further comprising a step of:
loading a blank on the worktable of the computer numerical controlled machine if the dimensions and the material of any prior machined excess material is not suitable for the machine operations.

* * * * *